(12) United States Patent
Wellenreiter

(10) Patent No.: US 11,132,301 B2
(45) Date of Patent: Sep. 28, 2021

(54) METHOD FOR MANAGING VIRTUAL MEMORY

(71) Applicant: BULL SAS, Les Clayes sous Bois (FR)

(72) Inventor: Francois Wellenreiter, Vourey (FR)

(73) Assignee: BULL SAS, Les Clayes sous Bois (FR)

( * ) Notice: Subject to any disclaimer, the term of this patent is extended or adjusted under 35 U.S.C. 154(b) by 89 days.

(21) Appl. No.: 16/474,551

(22) PCT Filed: Dec. 28, 2017

(86) PCT No.: PCT/FR2017/053863
§ 371 (c)(1),
(2) Date: Jun. 28, 2019

(87) PCT Pub. No.: WO2018/122539
PCT Pub. Date: Jul. 5, 2018

(65) Prior Publication Data
US 2019/0384723 A1    Dec. 19, 2019

(30) Foreign Application Priority Data

Dec. 28, 2016 (FR) ..................... 16 63459

(51) Int. Cl.
*G06F 12/10* (2016.01)
*G06F 12/1036* (2016.01)
(Continued)

(52) U.S. Cl.
CPC ...... *G06F 12/1036* (2013.01); *G06F 12/0223* (2013.01); *G06F 12/1081* (2013.01); *G06F 2212/502* (2013.01); *G06F 2212/657* (2013.01)

(58) Field of Classification Search
CPC ............. G06F 12/1036; G06F 12/0223; G06F 12/1081; G06F 12/08; G06F 2212/502; G06F 2212/657; G06F 2212/1032
See application file for complete search history.

(56) References Cited

U.S. PATENT DOCUMENTS 6,298,439 B1 * 10/2001 Beglin ................. G06F 3/0607
                                                              711/111
7,065,630 B1    6/2006 Ledebohm et al.
(Continued)

OTHER PUBLICATIONS

Y. Zhou, Y. Zhang, H. Liu, N. Xiong and A. V. Vasilakos, "A Bare-Metal and Asymmetric Partitioning Approach to Client Virtualization," in IEEE Transactions on Services Computing, vol. 7, No. 1, pp. 40-53, Jan.-Mar. 2014, doi: 10.1109/TSC.2012.32. (Year: 2014).*
(Continued)

*Primary Examiner* — Khoa D Doan
(74) *Attorney, Agent, or Firm* — Meagher Emanuel Laks Goldberg & Liao, LLP

(57) ABSTRACT

Disclosed is a method for managing, in a computer system including a peripheral device and its driver, a virtual memory of a using application of the peripheral device which can access the virtual memory of the using application, the management method including: the creation, in the virtual memory of the using application, of a virtual memory pool which is accessible to the peripheral device but inaccessible to the using application; and the creation of a management application that is separate from the using application and is dedicated to the allocation of at least this virtual memory pool and to the releasing of at least this virtual memory pool.

19 Claims, 2 Drawing Sheets

(51) Int. Cl.
G06F 12/02 (2006.01)
G06F 12/1081 (2016.01)

(56) References Cited

U.S. PATENT DOCUMENTS 9,983,914 B2 * 5/2018 Plonka ................ G06F 11/3037
2007/0245041 A1 10/2007 Hua et al.
2009/0037941 A1 2/2009 Armstrong et al.
2012/0265916 A1 10/2012 Nordstrom et al.

OTHER PUBLICATIONS

G. Marcus, W. Gao, A. Kugel and R. Männer, "The MPRACE framework: An open source stack for communication with custom FPGA-based accelerators," 2011 VII Southern Conference on Programmable Logic (SPL), 2011, pp. 155-160. (Year: 2011).*
International Search Reported—PCTFR2017/053863—dated Feb. 26, 2018.

* cited by examiner

METHOD FOR MANAGING VIRTUAL MEMORY

FIELD OF THE INVENTION

The invention relates to the field of methods for managing, in a computer system including a peripheral device and its driver, a virtual memory of a using application of the peripheral device, as well as corresponding computer systems.

BACKGROUND OF THE INVENTION

According to a prior art, in a computer system including a peripheral device and its driver, as well as a using application of the peripheral device where this using application has a virtual memory, it is known to create another virtual memory for the needs of the device which is managed by its driver. Although of modest size, this other virtual memory requires creation and management steps that are overdesigned given the modest size required for this other virtual memory.

This prior art therefore has the disadvantage of requiring another virtual memory necessitating overdesigned creation and management steps given the modest size of this other virtual memory.

In particular, during the operation of the using application of the peripheral device, the virtual memory of this using application would be used as well as the other virtual memory of the driver, at least during its operation for the purposes of this using application. Therefore two virtual memories must continuously be managed for the requirements of a single using application.

SUMMARY OF THE INVENTION

The aim of the present invention is to provide a method for managing virtual memory which at least partially overcomes the above disadvantages.

The invention will therefore propose doing without this other virtual memory, simply by using the virtual memory of the using application since this virtual memory already exists, is of appreciable size, and only a limited and generally minor portion of this virtual memory would be reserved for the peripheral device driver.

More particularly, the invention aims to provide a method for managing the virtual memory of the using application enabling it to use a portion, generally a small portion, for the peripheral device driver.

In order for this portion of the virtual memory of the using application of the peripheral device to be used by the device driver in a properly secure manner, the invention proposes a first level of security by establishing a virtual memory pool in the virtual memory of the using application, this virtual memory pool being rendered inaccessible to the using application. To do this, an application for managing this virtual memory pool is created that is separate from the using application. This prevents the using application from inadvertently or maliciously accessing this virtual memory pool and modifying its contents, which could then interfere with the operation of the peripheral device driver and infect other applications using this device and its driver.

The invention also simultaneously proposes a second level of security by dedicating this management application to managing this virtual memory pool. This prevents the other operations that this management application would perform, aside from this virtual memory management or other virtual memory management, in particular for the using application, from otherwise inadvertently or maliciously accessing the virtual memory pool and modifying its contents.

Consequently, this management application is therefore not a second using application of the same type or of a similar type or comparable to that of the first using application, which is simply different from the first using application and which consequently could also harm the contents of the virtual memory pool; instead, it is a "specialized" application in virtual memory management, for one or more applications using this peripheral device.

This dedicated management application is not easily accessible from outside the computer system, as is the case for using applications more easily accessible by users external to the computer system. Since by definition these external users are subject to fewer controls than the kernel of the computer system, the risk of errors and/or malicious acts is significantly higher for them.

The present invention therefore proposes a method for managing, in a computer system including a peripheral device and its driver, a virtual memory of a using application of the peripheral device which can access the virtual memory of the using application, characterized in that the management method comprises: creating, in the virtual memory of the using application, a virtual memory pool which is accessible to the peripheral device and inaccessible to the using application; creating a management application that is separate from the using application and is dedicated to the allocation of at least this virtual memory pool and to the releasing of at least this virtual memory pool. Preferably, in the case of a single using application to be managed, the management application is separate from the using application and is dedicated to the allocation of this virtual memory pool and to the release of this virtual memory pool. Preferably, in the case of a plurality of using applications to be managed, the management application is separate from the using application and is dedicated to the allocation of this virtual memory pool and to the release of this virtual memory pool as well as to the allocation of one or more other virtual memory pools and to the release of this or these other virtual memory pools, advantageously with at least one virtual memory pool per using application.

To this end, the present invention also proposes a computer system comprising: a peripheral device, a driver for this peripheral device, a using application of this peripheral device, a virtual memory of this using application, the using application being associated with the peripheral device such that the peripheral device can access the virtual memory of this using application, characterized in that the computer system further comprises: a management application, separate from the using application, dedicated to the allocation of at least one virtual memory pool and to the release of at least this virtual memory pool, this virtual memory pool being located in the virtual memory of the using application while being accessible to the peripheral device and inaccessible to the using application. Preferably, in the case of a single using application to be managed, the management application, separate from the using application, is dedicated to the allocation of a virtual memory pool and to the release of this virtual memory pool. Preferably, in the case of a plurality of using applications to be managed, the management application, distinct from all these using applications, is dedicated to the allocation of a plurality of virtual memory pools and to the release of these virtual memory pools, advantageously with at least one virtual memory pool per using application.

According to preferred embodiments of the invention, one or more areas of the virtual memory of the using application of the peripheral device can no longer be accessed by this using application for security reasons, whereas these areas of virtual memory of the using application remain freely usable by the device driver as an additional memory pool.

According to preferred embodiments, the invention comprises one or more of the following features which may be used separately or together in partial or complete combinations with any of the aforementioned objects of the invention.

Preferably, the management application is created by the driver of the peripheral device. The operation is therefore simpler and more consistent, because this management application will access the virtual memory pool established in the virtual memory of the using application, for the device driver, for the purposes of this using application in its use of this peripheral device.

Preferably, the management application is registered in the peripheral device when it is created by the device driver. The device driver thus retains control of the management application that it has created.

Preferably, the allocation of this virtual memory pool and the release of this virtual memory pool are done dynamically at the request of the device driver. The device driver thus uses this virtual memory pool as intended at the creation of this virtual memory pool, and can use it quickly in real time or near-real time.

Preferably, the allocation of this virtual memory pool and the release of this virtual memory pool, in the virtual memory of the using application, for one or more using applications, are the only functions of the management application. This prevents the other operations performed by this management application, aside from this virtual memory management, from erroneously or maliciously accessing this memory pool and modifying the content. The application created by the device driver, in other words by the driver controlling the peripheral device, which is different from the using application, is registered with this driver and has the sole functions of allocating and/or deallocating areas of virtual memory via a dialog with this driver.

Preferably, the using application has been previously and specifically configured to allow the peripheral device to access the virtual memory of this using application. This allows the device driver to easily create the management application which itself will reserve a portion of this virtual memory. The device driver is able to access any area of the virtual memory of the using application of the device, this virtual application having been previously and specifically configured for this purpose.

Preferably, the peripheral device uses the virtual memory pool exclusively for the purposes of the corresponding using application. The size of the pool thus remains small and no data dedicated to other using applications will contaminate the virtual memory of this using application. Since the driver of the peripheral device needs memory for requirements strictly related to the operation of the using application of this peripheral device, it is useful to have access to at least some of the virtual memory of this using application.

Preferably, the same management application manages the virtual memory pools of a plurality of using applications of a same peripheral device, preferably all using applications of the same peripheral device, even more preferably all using applications of some or all of the peripheral devices of the computer system. This management application, "dedicated" to virtual memory management, thus is quite cost-effective.

Preferably, the virtual memory pool occupies strictly less than half of the memory space of the virtual memory in which it is stored. Thus, only a minor portion of the virtual memory of the using application is diverted from direct use by the using application.

Preferably, the virtual memory pool occupies less than 1% of the memory space of the virtual memory in which it is stored. There is thus no risk that reserving this very small proportion of the virtual memory of the using application will disrupt the operation of the using application due to a lack of available virtual memory, as the using application is not using all its virtual memory and in any case is not continuously using all its virtual memory.

Preferably, the device driver stores information, in the virtual memory pool, which is specific to the using application and which can enable access to other using applications if this information is modified. In this case, this confirms the particularly critical nature of the stored data, and the extent of the damage to the computer system that could result from unauthorized modification of these data by the using application, whether deliberate or not.

Preferably, this information is commands and/or table entries. These are important data, which can lead to incorrectly routing information if modified erroneously.

Preferably, the peripheral device is a network peripheral device enabling data exchanges between using applications. Thus, in the event of a malfunction, all communication between the using applications could be degraded or prevented, the using applications that received erroneous data via this communication then in turn degrading or shutting down their own operation, thus also disrupting the rest of the computer system.

The invention also relates to a computer system comprising computing members interconnected so as to be able to carry out the method for managing virtual memory of a using application of a peripheral device according to the invention.

Other features and advantages of the invention will be apparent from reading the following description of a preferred embodiment of the invention, given as an example and with reference to the accompanying drawings.

DETAILED DESCRIPTION OF THE INVENTION

Figure 1:
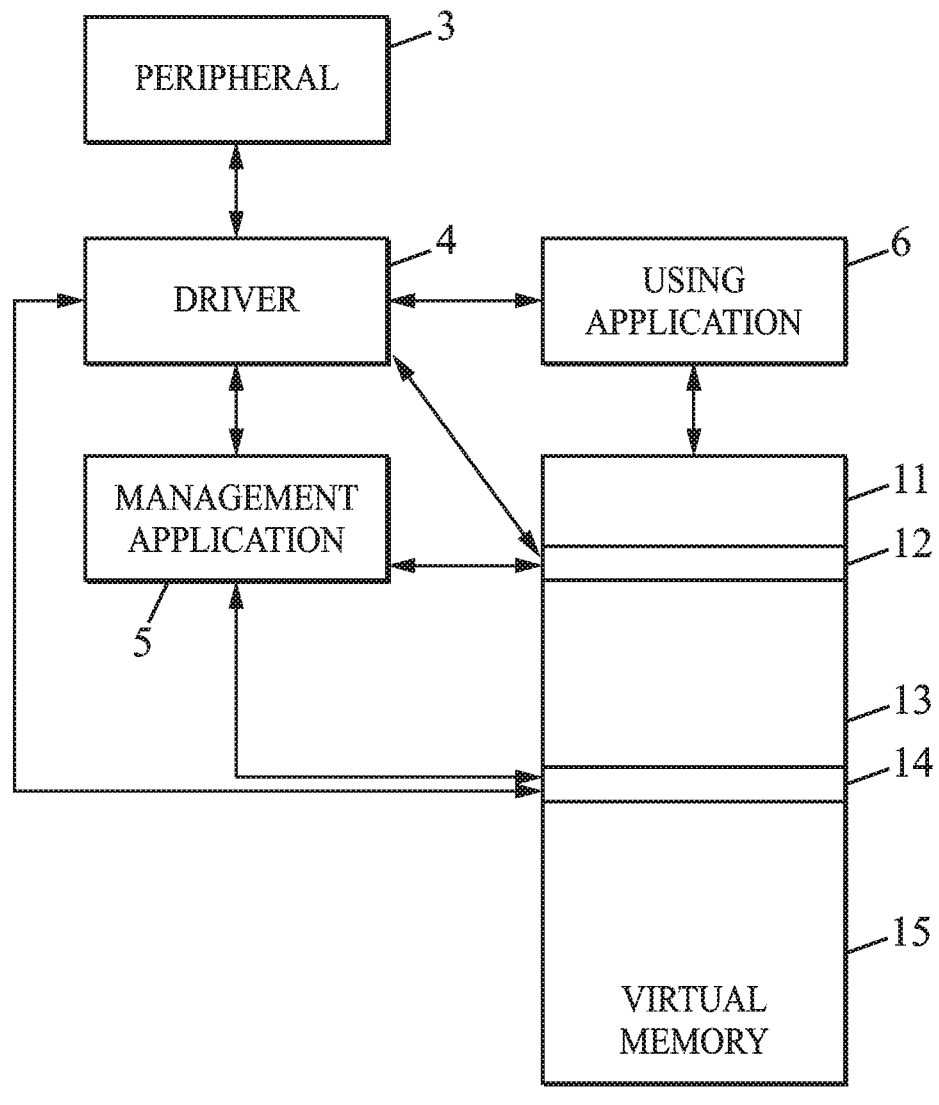
FIG. 1 schematically represents a first example of a computer system using a method for managing virtual memory according to one embodiment of the invention.

FIG. 1 schematically represents a first example of a computer system using a method for managing virtual memory according to one embodiment of the invention.

The computer system comprises a peripheral device 3, a driver 4 for this device 3, a using application 6 of this device 3, a virtual memory 1 of this using application 6, and a management application 5 created by the driver 4 in order to access the virtual memory 1, or more precisely to reserve a portion of this virtual memory 1 for the operation of the driver 4 for the purposes of the using application 6.

The virtual memory 1 comprises areas that always remain directly accessible to the using application 6, for example areas 11, 13 and 15.

The virtual memory 1 also comprises one or more areas that can be rendered temporarily or permanently inaccessible to the using application 6. This or these areas will preferably be made inaccessible to the using application 6 at least during the time that the using application 6 is using the peripheral device 3.

At a given moment, the management application allocates area 12 to the virtual memory pool for the driver 4. From that moment on, area 12 is no longer directly accessible by the using application 6. In contrast, area 14 remains directly accessible to the using application 6, as do areas 11, 13 and 15. The driver 4 directly uses area 12 for the purposes of the using application 6, but does not access any of areas 11 and 13 to 15.

At another, later moment, the management application releases area 12 and then allocates area 14 to the virtual memory pool for the driver 4. From that moment on, area 14 is no longer directly accessible by the using application 6. On the other hand, area 12 once again becomes directly accessible to the using application 6, and during all this time areas 11, 13 and 15 have remained directly accessible to the using application 6. The driver 4 directly uses area 14 for the requirements of the using application 6, but no longer accesses area 12, and also does not access areas 11, 13 and 15.

Figure 2:
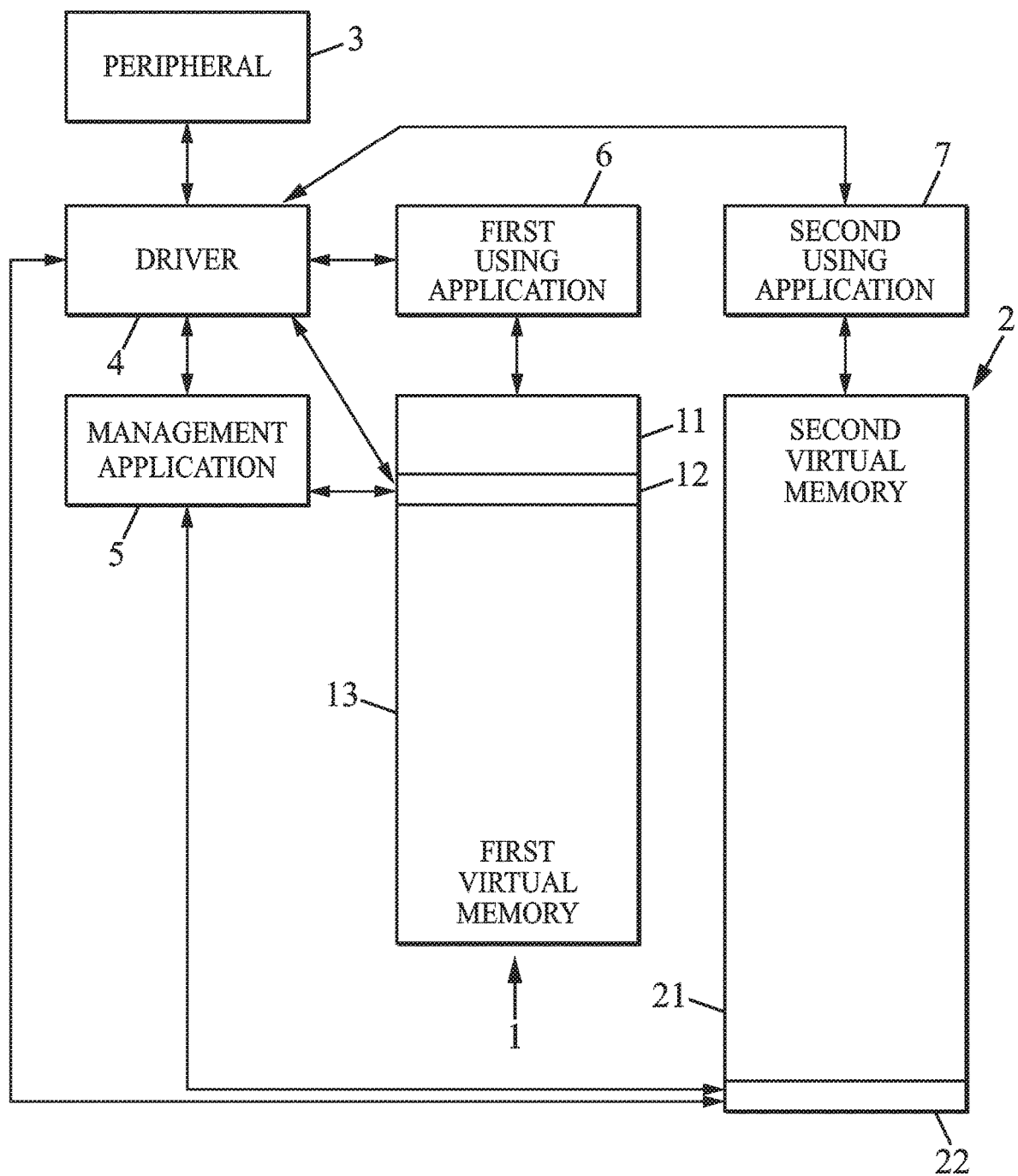
FIG. 2 schematically represents a second computer system using a method for managing virtual memory according to one embodiment of the invention.

FIG. 2 schematically represents a second computer system using a method for managing virtual memory according to one embodiment of the invention.

The computer system comprises a peripheral device 3, a driver 4 for this device 3, a first using application 6 and a second using application 7 of this device 3, a first virtual memory 1 of this first using application 6 and a second virtual memory 2 of this second using application 7, and a management application 5 created by the driver 4 in order to access both the first virtual memory 1 of the first using application 6 and the second virtual memory 2 of the second using application 7, or more specifically in order to reserve a portion of these virtual memories 1 and 2 for the operation of the driver 4 for the respective requirements of the first using application 6 and the second using application 7.

The virtual memory 1 comprises areas that always remain directly accessible to the first using application 6, for example areas 11 and 13. The virtual memory 1 also comprises an area 12 which is rendered temporarily or permanently inaccessible to the first using application 6. This area 12 will preferably be rendered inaccessible to the first using application 6 at least during the time that this first using application 6 is using the device 3.

At a given moment, the management application allocates area 12 to the virtual memory pool for the driver 4. From that moment on, area 12 is no longer directly accessible by the first using application. 6. In contrast, areas 11 and 13 remain directly accessible to the first using application 6. The driver 4 uses area 12 directly for the requirements of the first using application 6, but does not access either of areas 11 and 13.

The virtual memory 2 comprises an area that always remains directly accessible to the second using application 7, for example area 21. The virtual memory 1 also comprises an area 22 which is rendered temporarily or permanently inaccessible to the second using application 7. This area 22 will preferably be rendered inaccessible to the second using application 7 at least during the time that this second using application 7 is using the device 3. Alternatively, this area 22 could be released, and the virtual memory pool established or reestablished at another location in area 21.

At a given moment, the management application allocates area 22 to the virtual memory pool for the driver 4. From that moment on, area 22 is no longer directly accessible by the second using application. 7. In contrast, area 21 remains directly accessible to the second using application 7. The driver 4 directly uses area 22 for the purposes of the second using application 7, but does not access area 21.

As a preferred example, the size of the virtual memory pool may be 1 MB while the size of the virtual memory may be 256 GB. The ratio between the size of the virtual memory pool and the size of the virtual memory for a using application is advantageously less than 1000, or even less than 10,000, or even less than 100,000.

As a preferred example, the number of using applications managed by a management application may be 512. The number of using applications managed by a management application is advantageously greater than 10, or even 100.

Of course, the invention is not limited to the examples and to the embodiment described and shown, but it is capable of numerous variants accessible to those skilled in the art.

The invention claimed is:

1. Method for managing, in a computer system including a peripheral device (3) and a driver (4) for the peripheral device, a virtual memory (1, 2) of a using application (6, 7) of the peripheral device (3) which can access the virtual memory (1, 2) of the using application (6, 7), wherein the management method comprises:

creating, in the virtual memory (1, 2) of the using application (6, 7), a virtual memory pool (12, 14, 22) which is accessible to the peripheral device (3) and inaccessible to the using application (6, 7), creating a management application (5) that is separate from the using application (6, 7) and is dedicated to the allocation of at least this virtual memory pool (12, 14, 22) and to the releasing of at least this virtual memory pool (12, 14, 22), wherein the management application (5) is created by the driver (4) of the peripheral device (3).

2. Method for managing virtual memory according to claim 1, wherein the management application (5) is registered in the peripheral device (3) when it is created by the driver (4) of the peripheral device (3).

3. Method for managing virtual memory according to claim 2, wherein the allocation of the virtual memory pool (12, 14, 22) and the release of the virtual memory pool (12, 14, 22) are done dynamically at the request of the driver (4) of the peripheral device (3).

4. Method for managing virtual memory according to claim 2, wherein the allocation of the virtual memory pool (12, 14, 22) and the release of the virtual memory pool (12, 14, 22), in the virtual memory (1, 2) of the using application (6, 7), for one or more using applications (6, 7), are the only functions of the management application (5).

5. Method for managing virtual memory according to claim 1, wherein the allocation of this virtual memory pool (12, 14, 22) and the release of this virtual memory pool (12, 14, 22) are done dynamically at the request of the driver (4) of the peripheral device (3).

6. Method for managing virtual memory according to claim 1, wherein the allocation of this virtual memory pool (12, 14, 22) and the release of this virtual memory pool (12, 14, 22), in the virtual memory (1, 2) of the using application (6, 7), for one or more using applications (6, 7), are the only functions of the management application (5).

7. Method for managing virtual memory according to claim 1, wherein the using application (6, 7) has been previously and specifically configured to allow the peripheral device (3) to access the virtual memory (1, 2) of this using application (6, 7).

8. Method for managing virtual memory according to claim 1, wherein the peripheral device (3) uses the virtual memory pool (12, 14, 22) exclusively for the purposes of the corresponding using application (6, 7).

9. Method for managing virtual memory according to claim 1, wherein the management application (5) manages virtual memory pools (12, 14, 22) of a plurality of using applications (6, 7) of the peripheral device (3).

10. Method for managing virtual memory according to claim 1, wherein the virtual memory pool (12, 14, 22) occupies less than 1% of the memory space of the virtual memory (1, 2) in which the virtual memory pool is stored.

11. Method for managing virtual memory according to claim 1, wherein the driver (4) of the peripheral device (3) stores information, in the virtual memory pool (12, 14, 22), which is specific to the using application (6, 7) and which can enable access to other using applications (6, 7) if the information is modified.

12. Method for managing virtual memory according to claim 11, wherein the information is commands and/or table entries.

13. Method for managing virtual memory according to claim 1, wherein the peripheral device (3) is a network peripheral device enabling data exchanges between using applications (6, 7).

14. Computer system comprising computer members interconnected so as to be able to carry out the method for managing virtual memory (1, 2) of a using application (6, 7) of a peripheral device (3) according to claim 1.

15. Method for managing virtual memory according to claim 1, wherein the allocation of the virtual memory pool (12, 14, 22) and the release of the virtual memory pool (12, 14, 22) are done dynamically at the request of the driver (4) of the peripheral device (3).

16. Method for managing virtual memory according to claim 1, wherein the allocation of the virtual memory pool (12, 14, 22) and the release of this virtual memory pool (12, 14, 22), in the virtual memory (1, 2) of the using application (6, 7), for one or more using applications (6, 7), are the only functions of the management application (5).

17. Method for managing virtual memory according to claim 1, wherein the management application (5) manages virtual memory pools (12, 14, 22) of a plurality of using applications (6, 7) of the peripheral device (3), all using applications (6, 7) of the peripheral device (3).

18. Method for managing virtual memory according to claim 1, wherein the management application (5) manages the virtual memory pools (12, 14, 22) of a plurality of using applications (6, 7) of the peripheral device (3), all using applications (6, 7) of some or all peripheral devices (3) of the computer system.

19. Computer system comprising:
a peripheral device (3),
a driver (4) for the peripheral device (3),
a using application (6, 7) of the peripheral device (3),
a virtual memory (1, 2) of the using application (6, 7),
the using application (6, 7) being associated with the peripheral device (3) such that the peripheral device (3) can access the virtual memory (1, 2) of the using application (6, 7), wherein the computer system further comprises:
a management application (5), separate from the using application (6, 7), dedicated to the allocation of at least one virtual memory pool (12, 14, 22) and to the release of at least the at least one virtual memory pool (12, 14, 22), wherein the management application (5) is created by the driver (4) of the peripheral device (3),
the at least one virtual memory pool (12, 14, 22) is located in the virtual memory (1, 2) of the using application (6, 7) while being accessible to the peripheral device (3) and inaccessible to the using application (6, 7).

* * * * *